United States Patent [19]
Deng et al.

[11] Patent Number: 6,005,863
[45] Date of Patent: Dec. 21, 1999

[54] FRAME SWITCH WITH SERIAL DATA PROCESSING

[75] Inventors: Jay Jie Deng, Union City; Lian S. Xie, Fremont; Jun Yu, Milpitas, all of Calif.

[73] Assignee: Advanced Communication Devices Cororation, Fremont, Calif.

[21] Appl. No.: 08/846,708

[22] Filed: Apr. 30, 1997

Related U.S. Application Data

[60] Provisional application No. 60/017,816, May 16, 1996.

[51] Int. Cl.$^6$ .................................................. H04L 12/56
[52] U.S. Cl. ........................................... 370/392; 709/238
[58] Field of Search ..................................... 370/392, 394, 370/412, 422, 427, 401, 402, 389; 709/238

[56] References Cited

U.S. PATENT DOCUMENTS

| | | | |
|---|---|---|---|
| 4,641,302 | 2/1987 | Miller | 370/422 |
| 5,157,654 | 10/1992 | Cisneros | 370/414 |
| 5,309,432 | 5/1994 | Kanakia | 370/412 |
| 5,440,550 | 8/1995 | Follett | 370/427 |
| 5,757,795 | 5/1998 | Schnell | 370/392 |

*Primary Examiner*—Zarni Maung
*Assistant Examiner*—Patrice Winder
*Attorney, Agent, or Firm*—Pennie Edmonds LLP

[57] ABSTRACT

A data frame switching apparatus has number data ports and a port traffic management unit for each port. Each port traffic management unit includes a physical layer unit for receiving and transmitting data frames, a serial shift register for temporarily storing a portion of each received data frame in serial data format, and a port controller for extracting each data frame's source and destination address from the portion of the data frame stored in the serial shift register. A crossbar switch connects any specified one of the data ports that is receiving a data frame to another one of the data ports so as to transmit the received data frame to a corresponding destination. A global traffic manager and lookup engine map the destination address of each received data frame to a corresponding destination port, determine the availability of the destination port, and when the destination port if available, send setup signals to the switch so as to connect the data port on which the data frame is being received to the destination port.

4 Claims, 6 Drawing Sheets

Lookup Engine

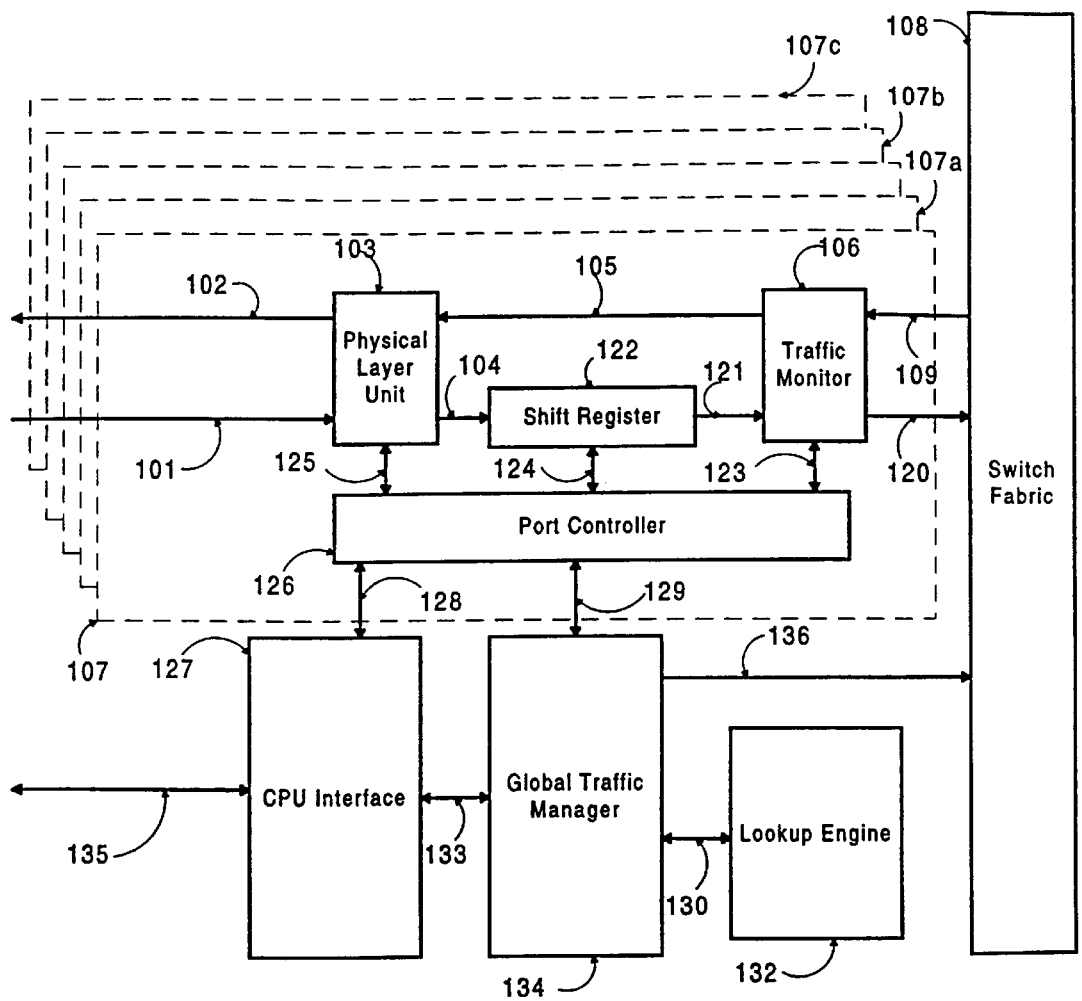
FIG 1. Frame Switch System Block Diagram

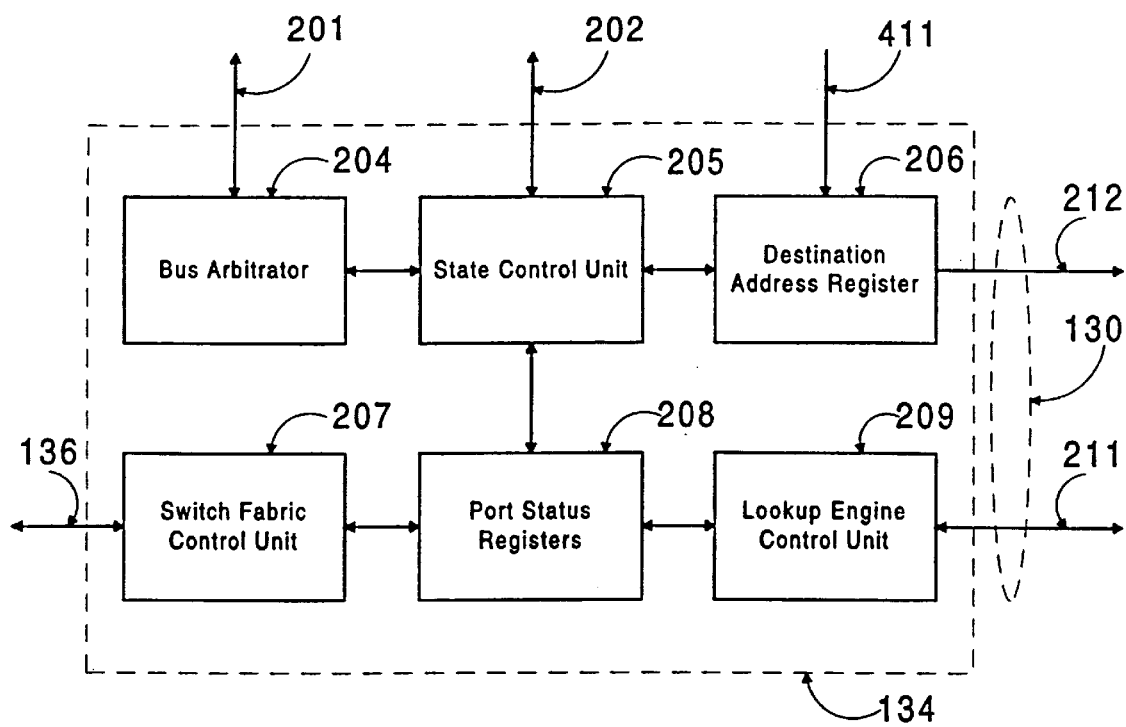
FIG 2. Global Traffic Manager

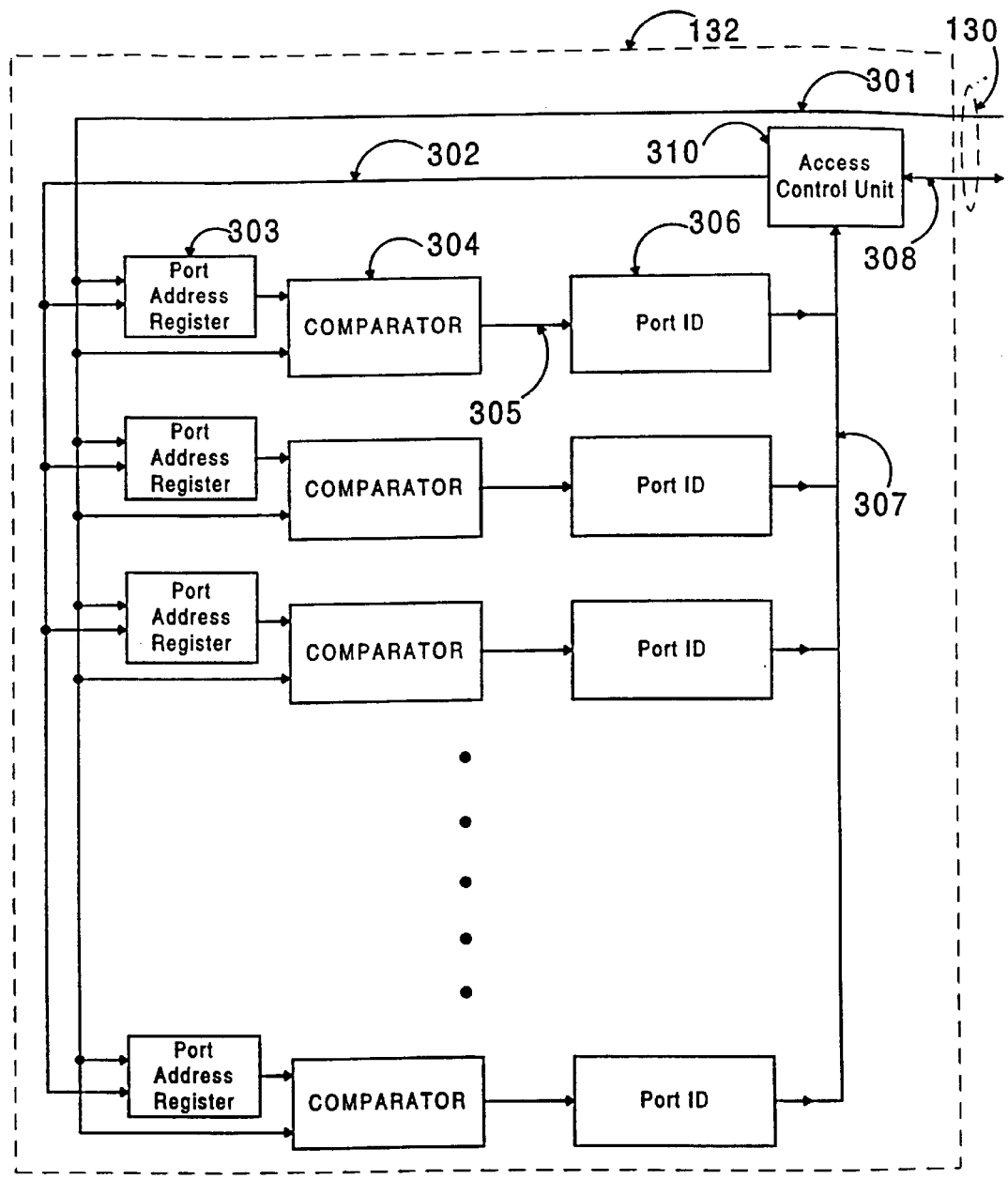
FIG 3. Lookup Engine

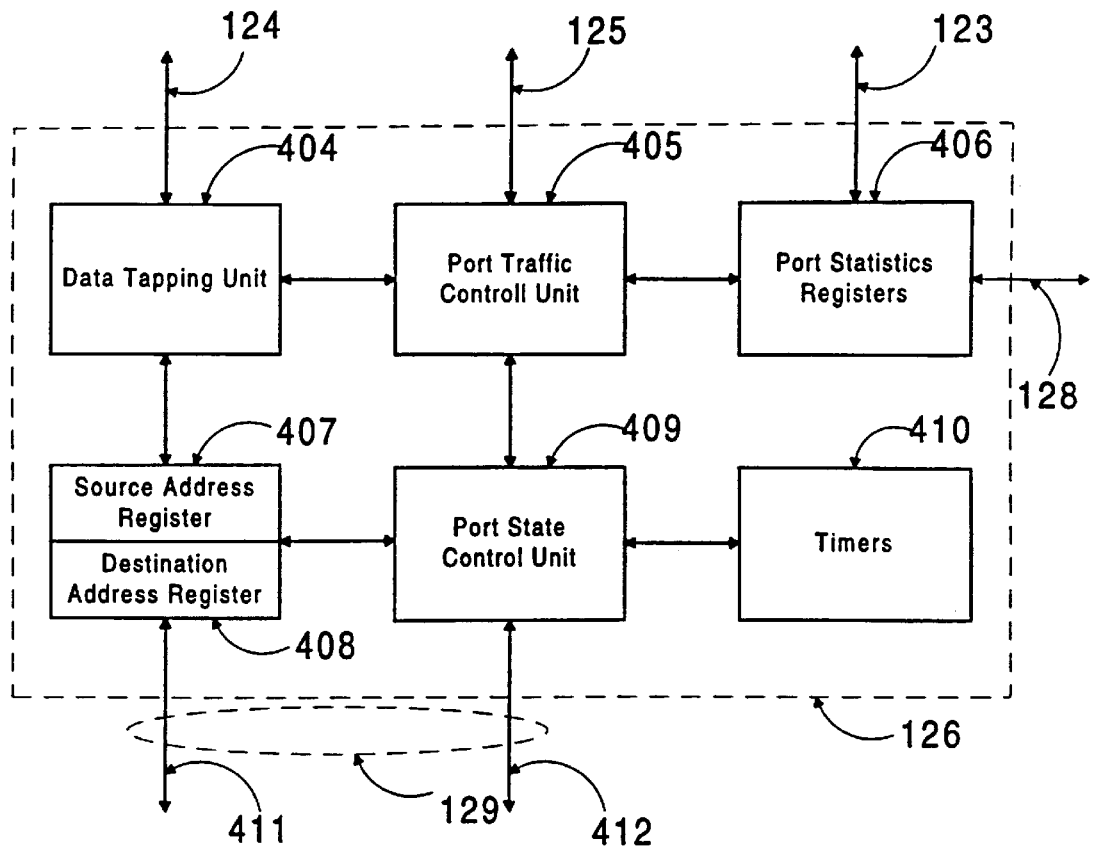
FIG 4. Port Controller

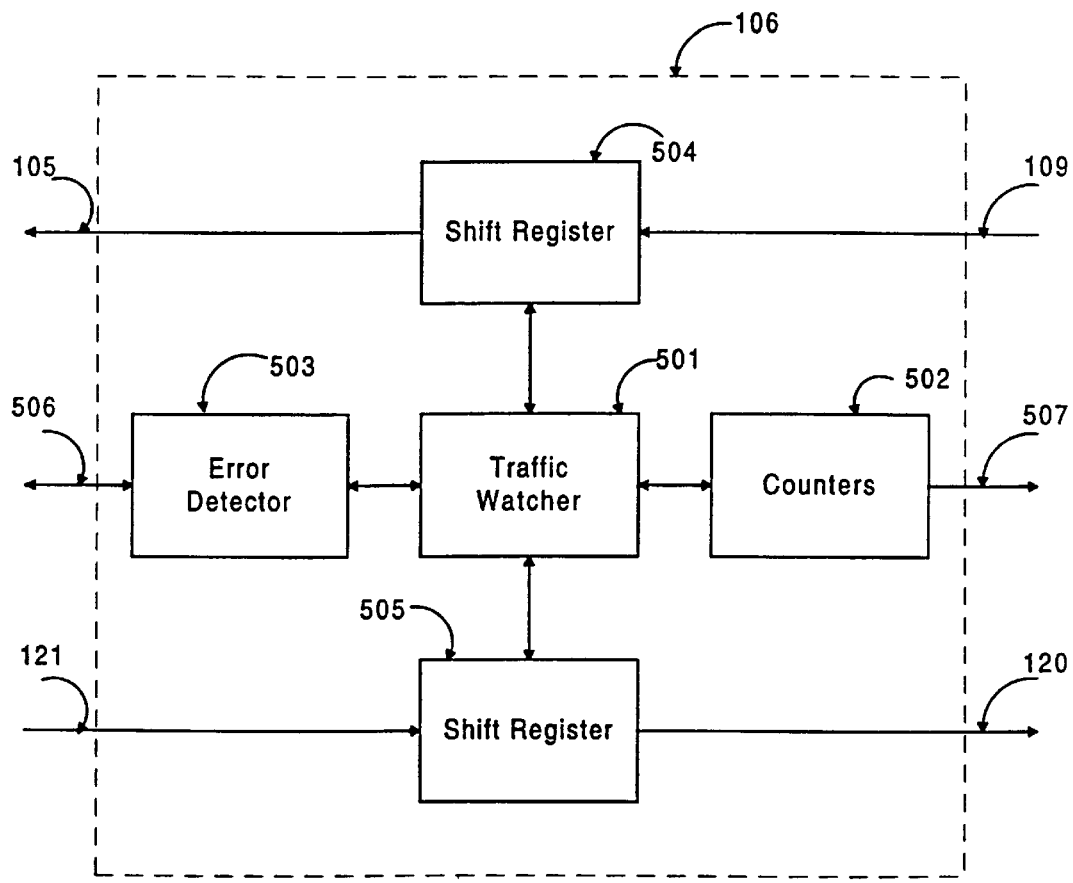
FIG 5. Traffic Monitor

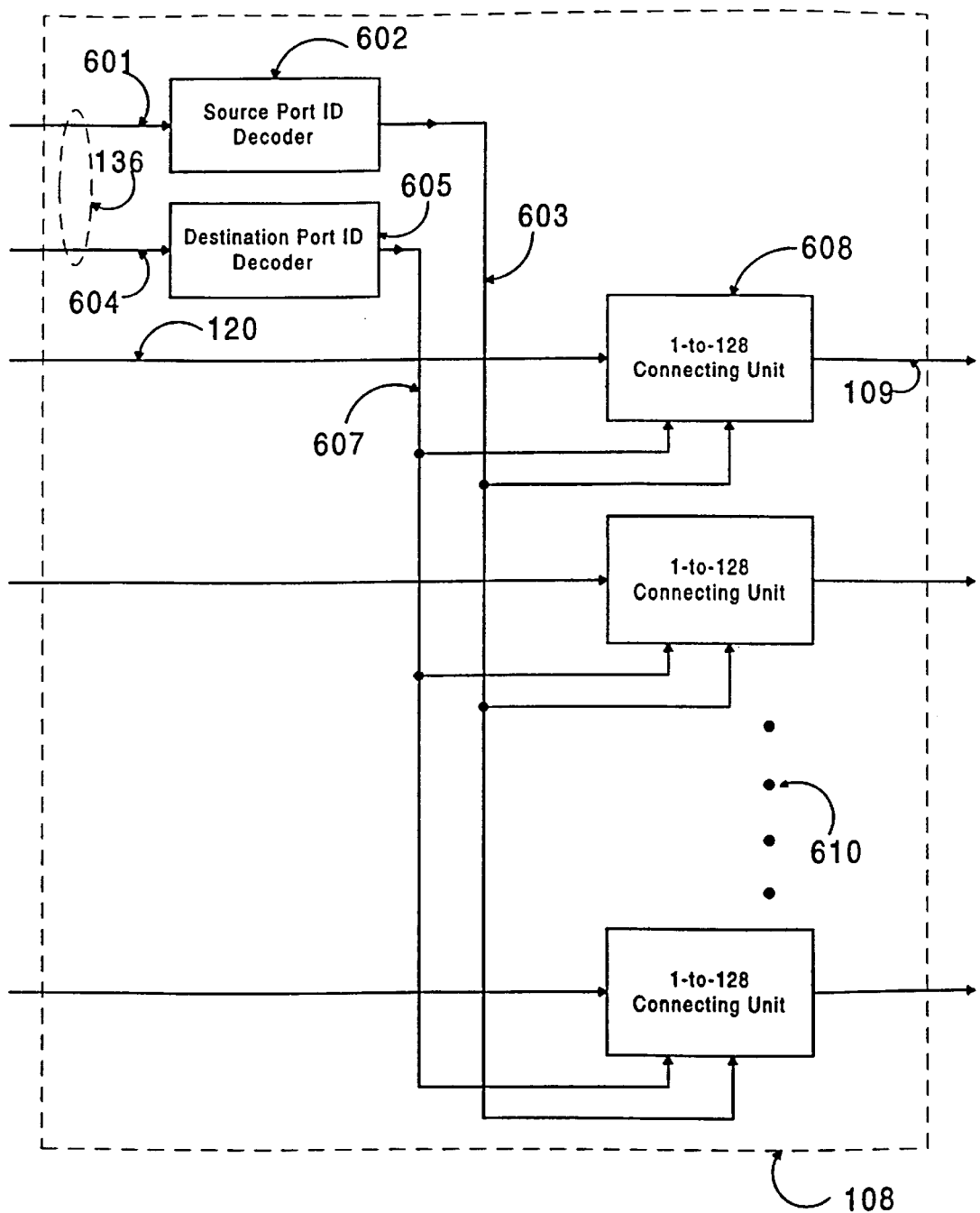
FIG 6. Switch Fabric

FRAME SWITCH WITH SERIAL DATA PROCESSING

This application is a continuation of U.S. provisional patent application 60/017,816, filed May 16, 1996.

This invention relates generally to frame or packet switches for high performance computer networks such as Ethernet and Fast Ethernet, and particularly to a highly modular crossbar switch that efficiently handles the destination routing of frame or packets on the fly, without needing to buffer and store large portions of the frames or packets.

BACKGROUND OF THE INVENTION

In a frame switching system, frames (also known as packets) can be received from plurality of source ports (where each port is connected to a computer work-station or another sub-network) and are directed to plurality of destination ports according to the destination addresses embedded in the frames. In conventional frame switches incoming serial data streams are buffered and converted into parallel data (e.g., in byte or 4-byte word size units). The parallel data for each data stream is then forwarded to one or more destination port by the "shared bus method" or the "shared memory method." The parallel data approach leads to complex circuit structures and very large internal data busses and/or large shared memory arrays.

SUMMARY OF THE INVENTION

Instead of following the traditional approach of converting received data streams into parallel data, the present invention retains the serial data format of the received frames and forwards each data stream in serial form to its destination port. Each serial data stream is serially clocked into a shift register. As the data stream is passing through the shift register, the embedded destination address and source address are tapped out of the shift register through its parallel output lines into corresponding storage registers. According to the value of the destination address, a control circuit will open a communication path between the source port and the corresponding destination port before the first bit of the data stream reaches the end of the shift register. This serial processing approach dramatically simplifies the frame switch architecture and enables a whole frame switch system with very high port density to be integrated into one integrated circuit.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of a preferred embodiment of a frame switch system.

FIG. 2 is a block diagram of a global traffic manager.

FIG. 3 is a block diagram of a lookup engine.

FIG. 4 is a block diagram of a port controller.

FIG. 5 is a block diagram of a traffic monitor.

FIG. 6 is a block diagram of the switch fabric used in a preferred embodiment.

DESCRIPTION OF THE PREFERRED EMBODIMENTS

The frame switch system shown in FIG. 1 includes a port traffic management unit 107 for each port of the frame switch system. Each port traffic management unit 107 handles traffic to and from a respective port. In FIG. 1, each port is represented by a pair of serial data lines 101, 102, where line 101 is the inbound serial data line and line 102 is the outbound serial data line. The number of ports in a system can range from four to several hundred (or possibly more). In a preferred embodiment, the frame switch system has 128 ports and 128 port traffic management units implemented on a single integrated circuit.

The frame switch system shown in FIG. 1 further includes a switch fabric 108, which is a 128 by 128 switching matrix, a CPU interface 127, a lookup engine 132 and a global traffic manager 134.

Incoming data frames (also known as packets) from a particular port are received by a physical layer unit 103 in the port traffic management unit 107 corresponding to that port. Physical layer unit 103 recovers a data clock embedded in the data signal, decodes the data bits into NRZ code format, and synchronizes the data bits with the system clock (not shown) of the frame switch. The synchronized data bits are forwarded to a shift register 122 before the frame switch can determine (A) the destination port the data frame should be forwarded to, and (B) whether or not that destination port is currently available.

Each port traffic management unit 107 further includes a port controller 126 that determines the integrity of the destination and source addresses, taps the source and destination addresses into a source address register 407 (see FIG. 4) and a destination address register 408 (FIG. 4) inside the port controller 126, respectively. More particularly, the destination and source addresses are positioned at predefined locations relative to the beginning of each data frame. The port controller 126 detects or determines the beginning bit position of each data frame, counts predefined numbers of data bit clock cycles until the source and destination addresses are positioned at the address tap position of the shift register 122, and then loads the source and destination addresses into the respective source and destination address registers 407, 408.

Upon loading the destination address into the destination address register 408, the port controller 126 of the source port requests the global traffic manager 134 to open the communication path from the input data path 120 of the source port to the output data path 109 of the destination port. If the destination address indicates a broadcast or multicast request, the destination ports will be all ports of the frame switch except the source port. If the destination address is a unicast address, the global traffic manager 134 asks the lookup engine 132 to map the destination address into a destination port number. The global traffic manager 134 stores all activity status information for each port. Upon receiving the destination port number from the lookup engine 132, the global traffic manager 134 checks the activity status of the destination port to determine whether to open the communication path in the switch fabric 108, or to signal the port controller 126 that a congestion condition has occurred. Switch fabric 108 is the actual switching matrix that connects the input data path 120 of the source port to the out data path 109 of the destination ports.

Each port's incoming and outgoing bit streams pass through the traffic monitor 106, which contains error detection logic to determine the condition of each passing data frame. Upon detecting the condition of a data frame, the traffic monitor 106 updates the corresponding port statistics registers 406 (FIG. 4) inside the port controller 126. Port statistics registers 406 are used for network management.

The port statistics registers are accessible to a CPU connected to the frame switch system through the CPU interface 127. The CPU interface 127 also enables a data processor to configure the frame switch system and to access all the port status registers inside global traffic manager 134.

PHYSICAL LAYER UNIT

Referring to FIG. 1, in the preferred embodiment, the Physical Layer Unit (Label 103, FIG. 1) has two major functions. On the transmitting side, it converts NRZ formatted data coming from the switch fabric 108 of the system into a signal suitable for transmission on the network medium indicated as transmission path 102. On the receiving side, the Physical Layer Unit 103 recovers the data clock embedded inside the data signal coming from the network medium indicated as receiving path 101, and converts the data into NRZ code. The recovered clock and data are then provided to a synchronization FIFO inside Physical Layer Unit 103. The output of the FIFO is controlled by the system clock to send the data stream into the Shift Register 122.

The Physical Layer Unit 103 also includes logic for detecting various network conditions such as Link Integrity, Collision, etc. on the network medium, and for generating different kinds of signal patterns like Collision-Detection signal, Link Integrity Pulses, and Back-Pressure signals on the network medium. The Physical Layer Unit 103 indicates the detected network condition through the status lines in interface bus 125. The Port Controller 126 controls the Physical Layer Unit to generate the desired signal pattern through the control lines in interface bus 125.

SHIFT REGISTER

Shift Register 122 is used for storing the incoming data frame as it is being processed by the switching system. Data bits come in from its serial input line 104 and go out through its serial output line 121. It also has a group of parallel output lines and a set of control lines 124 for data tapping. As part of the Port Traffic Management Unit 107, one Shift Register 122 is required for every port in the switch system.

PORT CONTROLLER

FIG. 4 is a block diagram of the Port Controller 126. In FIG. 4, Interface Bus 411 and Interface Bus 412 together are equivalent to Interface Bus 129 in FIG. 1. Port Controller 126 controls the entire Port Traffic Management Unit 107. As an incoming data frame comes out of the Physical Layer Unit 103 and passes through Shift Register 122, the Data Tapping Unit 404 taps the source and destination address embedded in the data frame into source address register 407 and destination address register 408 respectively. Then the Port State Control Unit 409 starts timer 410 and asserts the bus request line in interface bus 412 for accessing the address bus of Global Traffic Manager 134. When the bus is granted to this particular Port Controller 126, it drives the bus with the value stored in destination address register 408. The Global Traffic Manager 134 latches the destination address into its address register 206. The Global Traffic Manager 134 then performs lookup and activity status checking processes and signals the requesting Port Controller 126 to indicate whether the communication path has been opened or congestion has occurred. Timer 410 inside Port Controller 126 generates a time-out signal if the bus is not granted and the first bit of the frame has reached the end of Shift Register 122. The Port Controller 126 treats this type of time-out the same as if congestion condition has occurred. When a congestion condition occurs, the Port Controller 126 generates a congestion control signal to the sending port to indicate the failure of the transmission.

Port Controller 126 also detects whenever there is a change in the source address of incoming data frames for a particular port, and initiates an updating process for changing the value of the corresponding port address register 303 (FIG. 3).

GLOBAL TRAFFIC MANAGER

FIG. 2 is a block diagram of the Global Traffic Manager 134. In FIG. 2, Interface Bus 211 and Interface Bus 212 together are equivalent to Interface Bus 130 in FIG. 1; Interface Busses 201, 202 and 411 together are equivalent to Interface Bus 129 plus Interface Bus 133 in FIG. 1. Global Traffic Manager 134 controls the communication path for the data frames passing through the Port Controllers 126. The address bus 411 and the state control bus 202 are shared among multiple Port Controllers 126. Upon latching the destination address of an incoming data frame, a Port Controller 126 asks Global Traffic Manager 134 for a grant of address bus 411 through a bus arbitration line dedicated to it in Interface Bus 201. Once the bus is granted to the requesting Port Controller 126, it passes the destination address information to Global Traffic Manager 134. Global Traffic Manager 134 has a bus arbitrator 204 that determines which Port Controller 126 can access address bus 411. After the bus is granted to a particular Port Controller 126, Global Traffic Manager 134 latches the destination address information into address register 206. Then, Global Traffic Manager 134 checks if the latched address is a multicast or broadcast address, or if it is a unicast address. If the address is a multicast or broadcast address, Global Traffic Manager 134 knows the destination ports are all ports except the source port. If the destination address is a unicast address, Global Traffic Manager 134 asks Lookup Engine 132 to convert the destination address into a destination port number. After determining the port to which the incoming frame is to be forwarded, the Global Traffic Manager 134 checks the corresponding Port Status Register(s) 208 to see if the port is available. If it is not, the Global Traffic Manager 134 will signal the Port Controller 126 that a congestion condition exists. If the destination port is available, the Global Traffic Manager 134 sends control signals the Switch Fabric 108 to open the corresponding communication path(s) and signals the Port Controller 126 that the communication path is ready. At the end of a message frame, the Port Controller 126 signals Global Traffic Manager 134 to release the associated communication path established in the Switch Fabric 108 and to update the corresponding Port Status Register 208.

LOOKUP ENGINE

FIG. 3 is a block diagram of the Lookup Engine 132. In FIG. 3, Interface Bus 301 and Interface Bus 308 together are equivalent to Interface Bus 130 in FIG. 1. The Lookup Engine 132 is equivalent to a content addressable memory. It has multiple Port Address Registers 303 that store the source addresses associated with each port. Port Address Register 303 can be updated by the Global Traffic Manager 134. When the Global Traffic Manager 134 tries to update a particular port address register 303 inside the Lookup Engine, the Access Control Unit 310 decodes the Port ID shown on the interface bus 308 and selects the corresponding Port Address Register 303. If the Global Traffic Manager asks the Lookup Engine 132 to convert a destination address into a port number, the Global Traffic Manager 134 drives the address bus 301 with the address value latched in its Destination Address Register 206. The Lookup Engine 132 compares the value on address bus 301 with the address stored in each of its Port Address Registers 303 using comparators 304. At most one of the comparators will detect a match and turn on the corresponding port ID register 206 to drive the port ID bus 307. Then the Access Control Unit 31 0 drives the value on port ID bus 307 onto the interface bus 308.

SWITCH FABRIC

FIG. 6 is a block diagram for the Switch Fabric 108. Switch Fabric 108 is a crossbar type switching fabric except that it is able to establish One-To-Multiple connections. In FIG. 6, Interface Bus 601 and Interface Bus 604 together are equivalent to Interface Bus 136 in FIG. 1. Switch Fabric 108 is used to establish the connection path between the input data path 120 of the source port at which an incoming data frame is being received, and the output data path 109 of the destination port specified by the embedded destination address information in the frame. After the Global Traffic Manager determines that the destination port is available, it sends control signals to the Switch Fabric 108 to turn on the communication path. Switch Fabric 108 has 128 1-to-128 connecting units 608. The connecting units 608 are controlled by a unit selection line 603 and a Port ID bus 607. Unit selection line 603 determines which connecting unit, if any, is being selected for set up. Once a connecting unit is selected, it connects the source port to the destination port(s) according to the value of the destination port number shown on Port ID bus 607. The connection stays valid until the incoming data frame is completely forwarded through the switch. At the end of each data transmission, Global Traffic Manager 134 releases the associated communication path in Switch Fabric 108.

TRAFFIC MONITOR

FIG. 5 is a block diagram for the Traffic Monitor 106. In FIG. 5, Interface Bus 506 and Interface Bus 507 together are equivalent to Interface Bus 123 in FIG. 1. The Traffic Monitor 106 monitors the bit streams on both the transmitting and receiving paths of traffic as they pass through shift registers 504 and 505, respectively. Traffic Monitor 106 uses counters 502 and an error detector 503 to detect the condition of the passing bit stream and generates control signals (on busses 506 and 507) to update corresponding counters 406 (FIG. 4) inside the Port Controller 126. The condition of a data frame is based on its bit count, byte count, checksum value and the occurrence of exceptional events like collision detection.

In the preferred embodiment, the Traffic Monitor 106 is implemented as a part of the Port Traffic Management Unit 107. The Traffic Monitor 106 can also be implemented so as to be shared by all ports of the switching system. In this case, only one set of statistics counters would exist and the traffic being monitored would be steered into the shared Traffic Monitor 106.

CPU INTERFACE

Referring to FIG. 1, the CPU Interface 127 is an interface between a host CPU and the switch system. The CPU Interface 127 provides a mechanism by which the host CPU can access internal registers. There are four categories of internal registers: Configuration Registers, Control Registers, Status Registers and Statistics Registers. The Configuration Registers and Control Registers are both readable and write-able by the host CPU while the Status Registers and the Statistics Registers can be read but not written by the host CPU.

Configuration registers are used to store configuration information for various modules inside the switching system. For example, the port address register 303 of the Lookup Engine is one kind of configuration register.

Control registers are used to control the operation of the switching system. For example, the CPU can dynamically enable or disable a port by setting a control register.

Status Registers store the current status of each port, such as link integrity, data traffic, collision or congestion and so on. The CPU can dynamically poll the port status registers, analyze the status information, and display the status information or results derived from the status information on a display device during normal operation of the switching system.

Statistics registers are a group of counters used for storing data traffic related information for network management use. They include frame counters, byte counters, bit counters and event counters for various traffic conditions.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A data frame switching system, comprising:

N data ports, where N is an integer greater than 3, each data port including a physical layer for receiving and transmitting data frames, a serial shift register for temporarily storing a portion of each received data frame in serial data format, and a port controller coupled to the serial shift register and physical layer for extracting from the portion of the data frame stored in the serial shift register a destination address associated with the data frame;

the port controller including means for extracting each data frame's source address from the portion of the data frame stored in the serial shift register, and further including source and destination registers for temporarily storing each source and destination address;

a serial data path switch, coupled to the data ports, for connecting any specified one of the data ports that is receiving a data frame to another one of the data ports so as to transmit the received data frame to a corresponding destination; wherein the source to destination data paths in the switch are serial data paths; and a global traffic controller, coupled to the port controller of each of the N data ports, for mapping the destination address of each received data frame to a corresponding destination port comprising one of the data ports, determining the availability of the destination port, and when the destination port if available, sending setup signals to the switch for connecting the data port on which the data frame is being received to the destination port;

the global traffic controller including a lookup engine that includes port address registers for storing address information associated with the data Ports and comparators, the port address registers including a respective port address register for each of the data ports, the comparators including a respective comparator for each of the data ports for comparing the address information stored in a respective one the port address registers with the destination address stored in the destination register of any one of the data ports that has received a data frame, and logic coupled to the comparators for generating a destination port identifier in accordance with result signals generated by the comparators, the lookup engine including logic for updating the address information stored in the respective port address register for each data port in accordance with the source address in each data frame received at that port.

2. The data frame switching system of claim 1, wherein each data frame's destination and source addresses are positioned at predefined locations relative to the data frame's beginning; the port controller including logic for determining a beginning bit position of each data frame, counting predefined numbers of data bit clock cycles until the source and destination addresses are positioned at an address tap position of the serial shift register, and then loading the source and destination addresses into the respective source and destination address registers.

3. A method of managing the transmission of data frames, comprising the steps of:

receiving and transmitting data frames at each of N data ports, where N is an integer greater than 3;

at each data port, temporarily storing a portion of each received data frame in a serial shift register in serial data format, and extracting a destination address and a source address from the portion of the data frame stored in the serial shift register; and storing address information associated with the data ports in port address registers, including a respective port address register for each of the data ports;

mapping the destination address of each received data frame to a corresponding destination port comprising one of the data ports, including comparing, in parallel, the address information stored in each of the port address registers with the destination address, and determining the destination port in accordance with results of the parallel address comparisons;

determining the availability of the destination port, and when the destination port if available, sending corresponding setup signals to a serial data path switch for connecting the data port on which the data frame is being received to the destination port; wherein each data frame is maintained in serial data format as it is transmitted through each data port and the serial data path switch and updating the address information stored in the respective port address register for each data port in accordance with the source address in each data frame received at that port.

4. The method of claim 3, wherein each data frame's destination and source addresses are positioned at predefined locations relative to the data frame's beginning; the extracting steps including determining a beginning bit position of each data frame, counting predefined numbers of data bit clock cycles until the source and destination addresses are positioned at an address tap position of the serial shift register, and then loading the source and destination addresses into the respective source and destination address registers.

* * * * *